(12) United States Patent
Li et al.

(10) Patent No.: US 11,594,901 B2
(45) Date of Patent: Feb. 28, 2023

(54) MULTIFUNCTIONAL CHARGING STATION TECHNICAL FIELD

(71) Applicant: Shenzhen Chifrog Technology Co., Ltd., Shenzhen (CN)

(72) Inventors: Fang Li, Shenzhen (CN); Yunzheng Jiang, Shenzhen (CN)

(73) Assignee: Shenzhen Chifrog Technology Co., Ltd., Shenzhen (CN)

( * ) Notice: Subject to any disclaimer, the term of this patent is extended or adjusted under 35 U.S.C. 154(b) by 516 days.

(21) Appl. No.: 16/679,145

(22) Filed: Nov. 8, 2019

(65) Prior Publication Data
US 2021/0143653 A1    May 13, 2021

(51) Int. Cl.
*H02J 7/02*      (2016.01)
*H02J 7/00*      (2006.01)

(52) U.S. Cl.
CPC .......... *H02J 7/0042* (2013.01); *H02J 7/0047* (2013.01); *H02J 7/02* (2013.01); *H02J 2207/20* (2020.01)

(58) Field of Classification Search
CPC .................................................... H02J 7/0042
See application file for complete search history.

(56) References Cited

U.S. PATENT DOCUMENTS

2011/0164471 A1*  7/2011  Baarman ............... H02J 7/025
                                                    307/104
2016/0170381 A1*  6/2016  Mininger ............... G04G 17/06
                                                    368/10

* cited by examiner

*Primary Examiner* — Robert Grant
(74) *Attorney, Agent, or Firm* — Calfee Halter & Griswold LLP

(57) ABSTRACT

A multifunctional charging station is provided. The multifunctional charging station includes a housing, an alarm clock, an AC input connector, an AC output interface, a DC output interface, a luminous display screen, a wireless charging system, a controller and a managing circuit. The multifunctional charging station is configured to optimally supply electrical power to AC and DC electric devices, while wirelessly charging electric devices at the same time, and functions as an alarm clock and lighting system (e.g., a nightlight).

14 Claims, 4 Drawing Sheets

MULTIFUNCTIONAL CHARGING STATION

TECHNICAL FIELD

The present disclosure relates generally to electrical devices, and more particularly, to a multifunctional charging station.

BACKGROUND

Mobile electronic devices (e.g., mobile phones, tablets, or notebooks) have become increasing important in everyday life. For example, more and more individuals use their mobile phone and/or tablets as part of their daily routine for making calls, checking e-mail or similar messages, socializing, and shopping. Most of these electronic devices are mobile, for convenience, and typically utilize a rechargeable battery for powering itself. These rechargeable batteries typically have a capacity limit, and based on the continued daily use of each electronic device, requires recharging multiple times during the electrical device's lifecycle. Unfortunately, the charging interface for many of these electronic devices differ, and may require different charging stations to recharge each device. Each charging interface may be based on the device type (e.g., a notebook as compared to a mobile phone) and/or the device manufacture. Additionally, the charging interface may only support one type of operation (e.g., a DC operation or AC operation) or provide only charging functionalities. Additionally, most charging stations are not compatible for wireless charging various electrical devices.

Accordingly, a need exists for a charging station that can support multiple charging interfaces and functions in a single assembly.

SUMMARY

At least one objective of the present disclosure is to provide a multifunctional charging station that supports both a wired and wireless electrical charging of AC electric devices, DC electric devices, and wireless charging capable devices, while providing time and lighting functions (e.g., alarm clock functions and night lighting). In order to achieve the above objective, the following technical solutions may be adopted.

In an exemplary embodiment, a multifunctional charging station (MCS) is provided. The MCS includes at least a housing adapted to at least partially enclose one or more components and/or systems therein. One or more of the components and/or systems may include a timer system, an AC input connector, an AC output interface, a DC output interface, a display screen, a wireless charging system, a controller, and a managing circuit.

The controller, the managing circuit, the alarm clock, and the wireless charging system are arranged in the housing. A top portion of the housing is provided with a plane for placing an electronic device. Portions of the wireless charging system is arranged below the plane. The luminous display screen is arranged on a side of the housing. The AC input connector, the AC output interface and the DC output interface are all arranged on a surface of the housing. An input end of the AC output interface is electrically connected with an output end of the AC input connector. The output end of the AC input connector is electrically connected with an input end of the managing circuit.

An input end of the alarm clock, an input end of the luminous display screen, an input end of the controller, an input end of the DC output interface, and an input end of the wireless charging system are electrically connected with an output end of the managing circuit, respectively, and the input end of the alarm clock is electrically connected with the input end of the luminous display screen and an output end of the controller.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Figure 1:
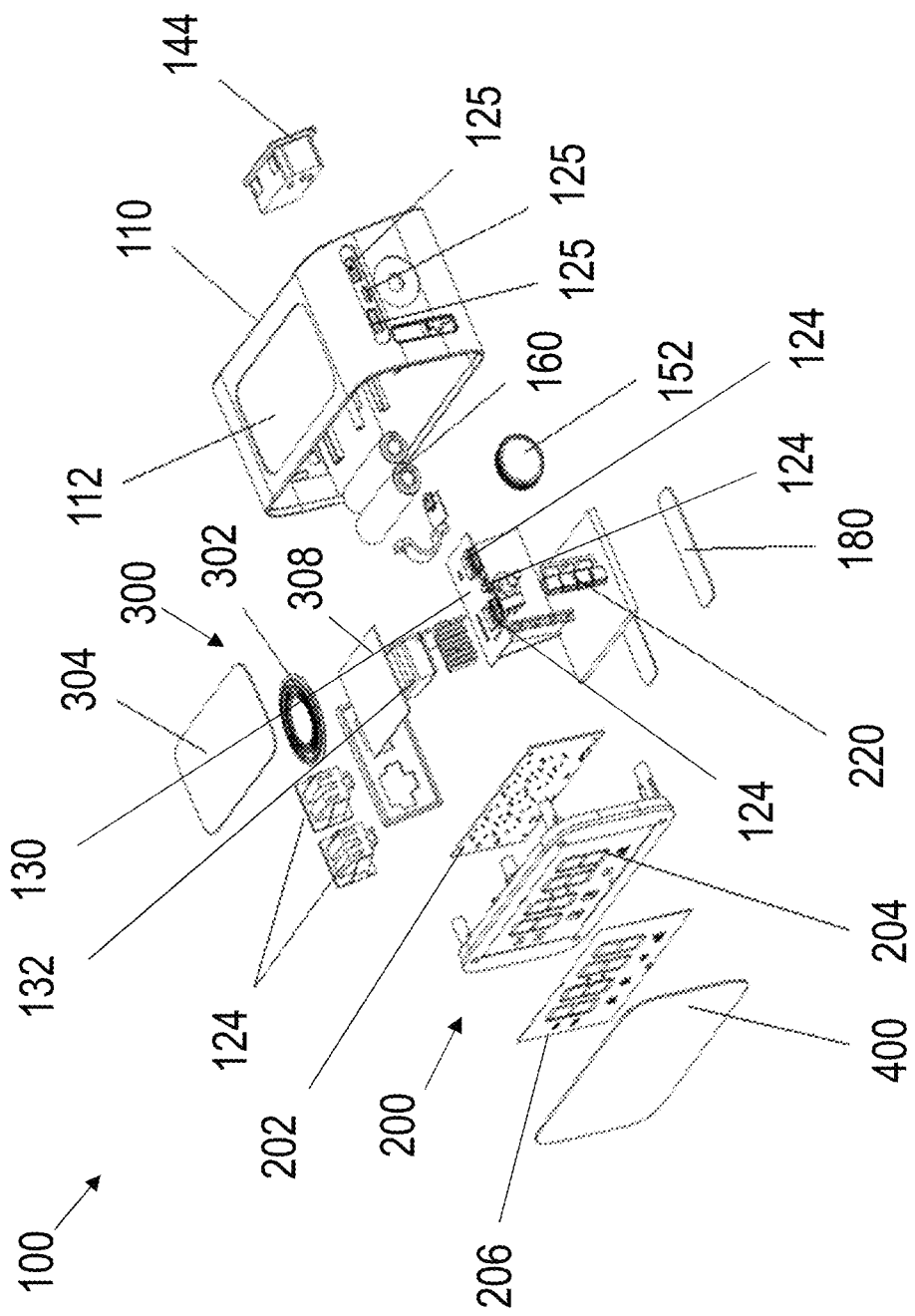
FIG. 1 illustrates an exploded view of an exemplary embodiment of a multifunctional charging station in accordance with the disclosure provided herein.

Referring now to the drawings, which are for purposes of illustrating exemplary embodiments of the subject matter herein only and not for limiting the same, FIG. 1 shows an exemplary embodiment of a charging station 100. The charging station 100 may be multifunctional, and in some embodiments, operable to perform simultaneous wired and wireless charging to multiple devices, for example, with optimal connectivity and reliability based on the distribution of electrical power via the charging station 100.

As illustrated in FIG. 1, the charging station 100 may include at least a housing 110. The housing 110 may be hollow and sized and/or shaped for at least partially enclosing one or more components and/or systems therein. In some embodiments, for example, as shown in the exemplary figures, the housing 110 may be cuboid shaped. However, it should be appreciated that other shapes may be provided for the housing 110 (e.g., a generally circular or tubular shape, a polygonal shape, or any combination of shapes).

The housing 110 may include one or more openings and/or recessed areas sized or otherwise shaped for at least partially receiving or otherwise enclosing components and/or systems of the charging station 100. In some embodiments, at least one of the systems may be a timer system 200.

Additionally, or alternatively, the charging station 100 may include a wireless charging system 300. In some embodiments, the timer system 200 and/or wireless charging system 300 may be at least partially enclosed within the housing 110 and/or within a recessed area 112 of the housing 110 (e.g., as shown in FIG. 1).

With continued reference to the figures, the housing 110 may include at least an upper portion (also called a top), a lower portion (also called a base), a front, a rear (also called a back), a first side, and a second side opposite the first side. The top of the housing 110 may include the recessed area 112. The recessed area 112 may be sized or otherwise shaped for at least partially receiving and/or interfacing with one or more components and/or systems of the charging station 100 (e.g., a charging module 302 (FIG. 1) and/or an anti-skid part 306 (FIG. 2A)).

It should be appreciated that the front, back, top, base, and sides of the housing 110 may be formed from multiple parts, or in some embodiments, most of the housing 110 may be a unibody (e.g., a shell forming mostly the top, portions of the base, and the sides of the housing 110). It should be also appreciated that the term components, as used herein, may include any of the circuits and/or convertors described herein.

Figure 3:
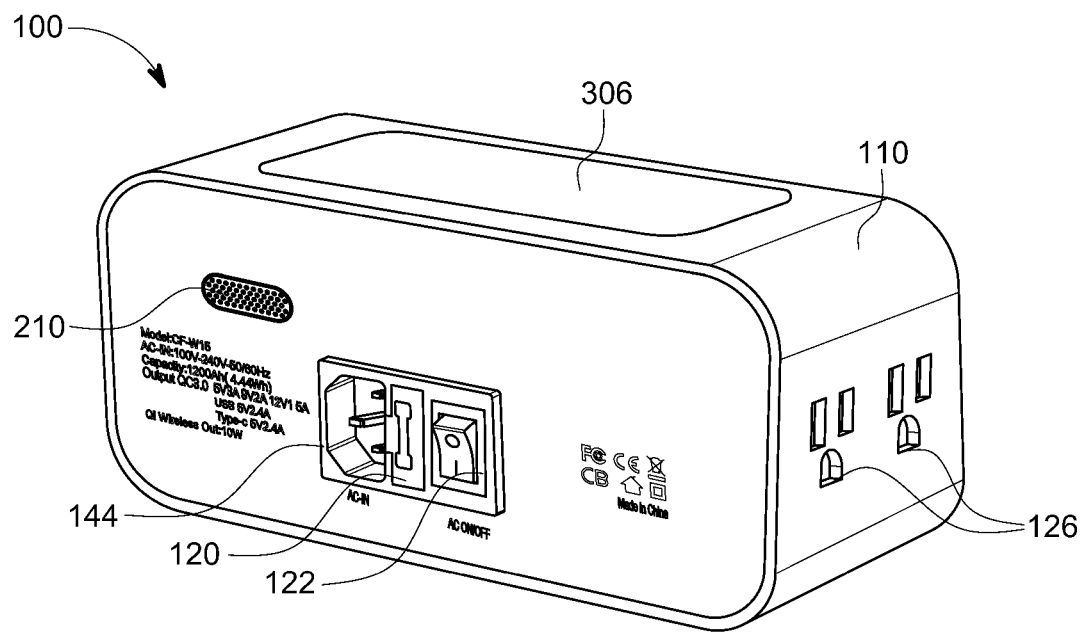
FIG. 3 illustrates a third perspective view of an exemplary embodiment of a multifunctional charging station in accordance with the disclosure provided herein.

With reference now to FIG. 3, the charging station 100 may further include an electrical power input 120 operable to receive electrical power from an external power source or supply (not shown). In some embodiments, the electrical power input 120 may be an international general standard connector in a triangle shape.

The electrical power input 120 may have an AC wide voltage input of 90V to 240V. The electrical power input 120 may be at least partially disposed in an opening or similar recess in the housing 110 (e.g., at a back of the housing 110) and may be connectable to an associated electrical cable (not shown) for connecting the charging station 100 to the external power source for receiving electrical power therefrom.

In some embodiments, the charging station 100 may include a power switch 122 for controlling (e.g., turning on/off) any electrical power flowing into the charging station 100 (e.g., through the electrical power input 120). It should be appreciated that the power switch 122 may be operable to turn on/off the functions of one or more of the AC output interfaces 126. The power switch 122 may be arranged proximate to the electrical power input 120 (e.g., at the back of the housing 110). In yet a further exemplary embodiment, as shown in FIG. 3, the electrical power input 120 and/or the power switch 122 may be arranged in an AC input interface box 144. The AC input interface box 144 may be disposed in an opening or similar recess at a rear of the charging station 100.

In some embodiments, the AC input interface box 144 may include one or more fuse wires to protect the charging station 100 from any harmful or otherwise undesirable surges.

In yet a further exemplary embodiment, the charging station 100 may include a fuse (not shown) operably connected to one or more fuse wires to protect the components and/or systems of the charging station 100 in the event of an overcurrent condition.

The fuse may be the first component to receive electrical power via the electrical power input 120, and may be immediately downstream from the electrical power input 120, and before any circuits and/or systems within the charging station 100.

In some embodiments, an input end of the fuse may be electrically connected to an output end of the electrical power input 120, and an output end of the fuse may be electrically connected to one or more of the other components and/or systems of the charging station 100, which may include, for example, an AC/DC rectifier circuit 132, a managing circuit system 130, an electrical power receptacle 124, and/or an AC output interface 126.

To provide overcurrent protection, the fuse may include a conductor (e.g., a small metal wire or strip) between one end of the fuse connected to the electrical power input 120 and another end of the fuse connected to the components and/or systems. In operation, the conductor melts when too much current flows from the electrical power input 120 and into the end of the fuse electrically connected thereto.

With continue reference to the figures, the AC/DC rectifier circuit 132 (also referred to as an AC/DC rectifier converter) may be downstream from the electrical power input 120 and/or fuse within the charging station 100.

In some embodiments, an input end of the AC/DC rectifier circuit 132 may be electrically connected to the output end of the electrical power input 120 (or the fuse). Additionally, or alternatively, an output end of the AC/DC rectifier circuit 132 may be electrically connected to input ends of one or more of the components and/or systems of the charging station 100, including, but not limited to, a power regulating circuit 136 and/or a DC/DC buck circuit 134.

The AC/DC rectifier circuit 132 may be configured to convert alternating current (AC) from the external power source to direct current (DC) for distributing DC power to the components/circuits and/or systems of the charging station 100. In some embodiments, the AC/DC rectifier circuit 132 may be a transformer, and as shown in FIG. 1, arranged within the housing 110, for example, beneath a wireless printed circuit board assembly (W-PCBA) 308.

In one exemplary embodiment of an operation of the charging station 100, and upon connecting the electrical power input 120 to an external power source, the AC/DC rectifier circuit 132 may output the converted DC power to the DC/DC Buck Circuit 134 and/or power regulating circuit 136. In some embodiments, the Controller 150 may be operable to determine whether the power regulating circuit 136 is functional and receiving the converted DC power, and/or whether the received DC power is sufficient to power one or more of the systems and/or component of the charging station 100.

In some embodiments, to determine whether the power regulating circuit 136 is functional, the controller 150 may monitor activity at the power regulating circuit 136 to detect one or more signals associated with or otherwise indicative of power being received via the electrical power input 120. Upon detecting the associated signals, the controller 150 may cause the AC/DC rectifier circuit 132 to connect to the power regulating circuit 136 and to the discharging circuit 140 so that the discharging circuit 140 may provide power to the charging station's 100 DC outputs (e.g., the Type-C, QC, PD, Wireless, USB-A).

Additionally, or alternatively, upon detecting the associated signals, the controller 150 may further determine whether the received power is sufficient to operate the components and/or systems of the charging station 100.

If the controller 150 determines that the received power is sufficient to operate the charging station 100 and/or one or more of its systems, the received power from the external power source is used for powering one or more of the systems and the charging stations 100.

In some embodiments, the charging circuit 138 may be initiated (if not otherwise initiated) upon determining that the received power is sufficient to power the each of the systems in the charging station 100. The initiated charging circuit 138 may then distribute electrical power from the external power source to the power bank 160.

Additionally, or alternatively, the discharging circuit 140 may be initiated (if not otherwise initiated) upon determining that the received power is sufficient to power the each of the systems in the charging station 100. The initiated discharging circuit 140 may then facilitate distributing electrical power (e.g., DC power) from the external power source to the systems and/or components of the charging station 100 (e.g., the timer system 200, the PD, QC3.0, USB-A, W-PCBA, and/or USB 5V 1 A)3.

It should be appreciated that if the controller 150 determines that no external power is being received via the electrical power input 120 and/or if the received DC power is not sufficient to power one or more of the charging station 100 systems or components, the controller 150 may cause the power bank 160 to begin discharging stored power within the power bank 160 to select systems not receiving power and/or receiving insufficient power so that those select systems may be fully operational.

In some embodiments, to determine the sufficiency of power for any of the components and/or systems, the controller 150 may be operable to compare the amount of power received via the electrical power input 120 to an operating threshold for one or more of the components and/or systems (e.g., a minimum electrical power threshold for operating each system of the charging station 100) to determine whether the received power is below the operating threshold.

If the controller 150 determines that the received power is beneath the operating threshold, and/or upon the controller 150 identifying or otherwise detecting a drop in power once determined to be sufficient, the controller 150 may be operable to cause the power bank 160 to discharge stored power to those systems not receiving power or receiving insufficient power. The power distributed by the power bank 160 (e.g., any supplemental power) should be sufficient for each system of the charging station 100 to be fully operational.

With continue reference to the figures, the charging station 100 may include a DC/DC buck circuit 134. The DC/DC buck circuit 134 may be a DC to DC power converter configured to step-down voltage from its input to its output. That is, the DC/DC buck circuit 134 may produce an output voltage that may be less than its input.

It should be appreciated, that in some embodiments, and if the power is from the electrical power input 120, the controller 150 may cause the AC/DC rectifier circuit 132 to connect to the DC/DC buck circuit 134 to the power regulating circuit 136 to the charging circuit 138 and then to the power bank 160 for charging the power bank 160 with DC power from the external power source.

In some embodiments, an output end of the DC/DC buck circuit 134 may be electrically connected with an input end of the power regulating circuit 136. After the AC to DC conversion, in some embodiments, the DC voltage may be 12V. The DC/DC buck circuit 134 may be operable to decrease the voltage to meet the voltage requirements of one or more of the USB output, QC3.0 output, PD output, clock voltage, and/or display. During this distribution operation, the AC/DC rectifier circuit 132 may connect to the DC/DC buck circuit 134 to the power regulating circuit 136 to the controller 150 and to the discharging circuit 140 for providing electrical power to the components and/or systems.

In some embodiment, when a PD function is desired, the required voltage may be 12V, 9V or 5V. Additionally, or alternatively, the QC3.0 may also require a different voltage. To meet these different voltage requirements, the distribution operation may include a connection route from the AC/DC rectifier circuit 132 to the power regulating circuit 136 to the controller 150 to the discharging circuit 140, and only then may the PD and/or QC3.0 outputs be provided the needed voltages.

In some embodiments, and to enhance efficiency, the design of the circuit board may be with a decreasing solution, resulting in adopting the DC/DC buck circuit 134 design for DC power.

With continued reference to the figures, the power regulating circuit 136 of the charging station 100 may be an intelligent regulating circuit switch, which may be controlled by the controller 150 (or similar microprocessor of the charging station 100). The power regulating circuit 136 may be downstream from the electrical power input 120 and/or fuse, and in some embodiments, downstream from at least the AC/DC rectifier circuit 132 and/or DC/DC buck circuit 134.

In some embodiments, the power regulating circuit 136 may be a voltage regulator. The voltage regulator may be an integrated circuit (IC) or system designed for maintain (manually and/or automatically) a constant voltage level. The IC may provide a constant fixed output voltage regardless of a change in the load or input voltage. In one exemplary embodiment, an output end of the power regulating circuit 136 may include a high-voltage out end and/or a low-voltage output end.

In some embodiments, and with the AC/DC rectifier circuit 132 outputs being at 12V voltage, the requirements for charging via the QC3.0 and PD digital device may be directly satisfied and without use of the DC/DC buck circuit 134. For example, to charge a 12V QC3.0 smartphone, the AC/DC rectifier circuit 132 may output directly to the power regulating circuit 136 the required voltage without first decreasing the voltage (e.g., via the DC/DC buck circuit 134). However, in an embodiment where a 5V mobile device requires charging, the above operation should be routed from the AC/DC rectifier circuit 132 to the DC/DC buck circuit 134, and then to the power regulating circuit 136.

In some embodiments, the controller 150 may include and/or otherwise control the power regulating circuit 136, the AC/DC rectifier circuit 132, the DC/DC buck circuit 134, the charging circuit 138, and/or the discharging circuit 140. Additionally, or alternatively, synchronized coordination may be controlled by the controller 150. When the controller 150 detects any output port voltage demands and/or any manual instructions, the controller 150 may order or otherwise cause the power regulating circuit 136 to regulate different voltages to meet the voltage demands, or open/close any circuit power output(s).

It should be appreciated that in some embodiments, and based on circuit design, each input and output for a circuit may be exclusively connected with a corresponding output and input, respectively, of another component of the charging station 100.

With continue reference to the figures, the timer system 200 may include an electrical circuit board 202 having circuitry for operating the timer system 200 and one or more light emitting diodes (LED) for displaying time and other timer functions. In some embodiments, the electrical circuit board 202 may include circuitry for the clock operations and/or circuitry for the alarm operations (e.g., in embodiments where the timer system 200 may be an alarm clock systems).

The timer system 200 may further include a front panel 204. The front panel 204 may be operably connected and/or secured to the electrical circuit board 202 at one side of the front panel 204. As shown in FIG. 1, the front panel 204 may be positioned towards a front of the housing 110. The front panel 204 may be provided to filter light from a digital screen (not shown) (e.g., an LED digital screen), and to allow for a clear display (e.g. of time) via the digital screen.

In yet a further embodiment, the timer system 200 may include a shield 206 for further filtering any light emitted from the electrical circuit board 202. In some embodiments, the shield 206 may be a filter shielding sticker, which may provide a clearly display of the LEDs via the electrical circuit board 202. As shown in FIG. 1, the shield 206 may be arranged on a second side of the front panel 204, which may be a different side from where the electrical circuit board 202 is operably connected.

In some embodiments, the timer system 200 may include executable programming logic stored in a memory of the timer system 200 or a memory operably connected thereto. The programming logic may include executable instructions for establishing a time (e.g., a time of day) and/or for alerting a user (e.g., at an alert time). It should be appreciated that any programming logic described herein may be executed by a processor (e.g., a processing circuit) of the charging station 100 and/or of one or more components and/or systems of the charging station 100.

With continue reference to FIG. 1, the charging station 100 may include a display interface (not shown). The display interface may be operably connected to a display screen 400 for displaying time associated with the time of day (past, present, and/or future), as well as other time related information (e.g., the alert time). The displayed information may be provided or otherwise emitted via the LEDs of the electrical circuit board 202.

In some embodiments, the timer system 200 may be operably connected to a speaker 210 or similar broadcasting device of the charging station 100 for alerting the user (e.g., in audible) upon achieving a predetermined time and/or alert time, which may be set by the user.

Additionally, or alternatively, and if a mobile device (e.g., a mobile phone, tablet, etc.) is connected to the charging station 100, for example, via Bluetooth or similar wireless or wired technologies, the timer system 200 may be operable to alert the user at the desired alert time via a notification system of the mobile device (e.g., the mobile device speaker and/or other feedback system (e.g., a haptic or similar vibrating system)).

In some embodiments, a user may control one or more functions of the charging station 100 via a software application on the user's mobile device, which may include programmable instructions for controlling one or more functions and/or systems of the charging station 100.

It should be appreciated that the software application may include a user interface (e.g., a graphic user interface) with one or more icons or similar indicia associated with a function of the charging station 100. Upon selection of an icon, the circuitry in the charging station 100 associated with the operation to be executed (or in some embodiments, the managing circuit system 130) may initiate the desired operation associated with the selected icon causing the charging station 100 to perform the desired functions (e.g., snoozing or stopping the timer system 200 from alerting the user via the speaker 210 and/or mobile device upon selection of a snooze icon). Additionally, or alternatively, operations of the speaker 210 may be controlled by or via the managing circuit system 130.

In some embodiments, the charging station 100 (or the timer system 200) may include a control panel 220 for adjusting time and/or for establishing or otherwise setting the alert time. In some embodiments, the control panel 220 operations may be controlled via the software application. Additionally, or alternatively, the control panel 220 may control the timer system 200 independent of the mobile device and/or any software application.

In some embodiments, the control panel 220 may include a touch screen interface.

Additionally, or alternatively, the control panel 220 may include one or more depressible buttons or keys for operating the timer system 200, including at least a confirm key "OK", a setting key "M", a plus key "+" and a minus key "−" for setting operations of the timer system 200. As shown in the figures, the control panel 220 may be at least partially enclosed within the housing 110 and externally accessible to the user, for example, via an opening in a side of the housing 110.

With continued reference to the figures, the charging station 100 may further include a display screen 400. The display screen 400 may be a luminous display screen, and in some embodiments, an LED display screen. The display screen 400 may be arranged or otherwise positioned at a front of the housing 110. In some embodiments, the display screen 400 may be frictionally fitted to the front of the housing 110 or secured at the front of the housing 110 via fasteners and/or other securing means known in the art for securing components to or within a housing.

A brightness of the display screen 400 may be adjustable, for example, to an illuminating emergency indicator lamp or a night lamp. In some embodiments, the display screen 400 may include one or more of a time display module for displaying time of day information, an alarm display module for displaying alarm and/or alert information, an AM/PM display module, a wireless charging display module, and/or a battery status display module.

Figure 4:
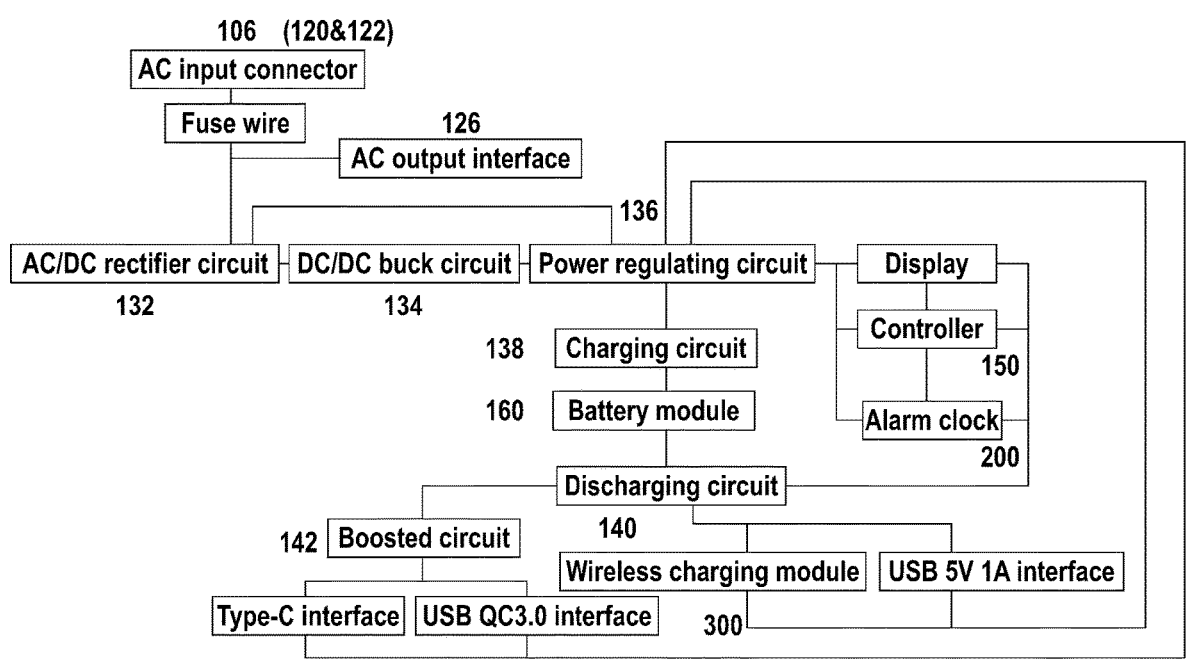
FIG. 4 illustrates an exemplary embodiment of an electrical connection diagram for a multifunctional charging station in accordance with the disclosure provided herein.

With reference now to FIG. 4, an input end of the controller 150 may be electrically connected with an output end of the discharging circuit 140.

Additionally, or alternatively, an input end of the controller 150 may be electrically connected with the low-voltage output end of the power regulating circuit 136. In some embodiments, when the electrical power input 120 is operational, the power regulating circuit 136 output may be divided into two channels. For example, a first channel may be provided for charging the built-in battery, while a second channel may be provided for powering one or more of the display module, the timer system 200, and the discharging circuit 140 (along with an any operationally connected wireless charging system 300, USB, PD and/or QC3.0).

In some embodiments, the controller 150 may be part of the managing circuit system 130, or in yet a further embodiment, its own system for controlling one or more operations of the charging station 100.

In yet a further exemplary embodiment, the charging station 100 may include a DC output regulator. The DC output regulator may be provided as part of the controller 150 or be operably connected to the controller 150 and/or another circuit (e.g., the discharging circuit 140). In some embodiments, an input end of the DC output regulator may be electrically connected to an output end of discharging circuit 140 and may distribute different voltages to different output terminals, such as the display screen 400 and timer system 200, as well as PD and/or QC3.0.

It should be appreciated that this may differ from the power regulating circuit 136, in that the power regulating circuit 136 may be aimed at regulating the power size after AC/DC. As such, the discharging circuit 140 is not only a discharging circuit 140, but also functions as a DC voltage regulator, which may also be controlled via the controller 150.

With continue reference to the figures, a knob 152 may be operably connected to the DC output regulator for controlling or otherwise regulating operations of one or more components and/or systems of the charging station 100 (e.g., a brightness of the display screen 400 and/or, in some embodiments, a time setting operation of the timer system 200). As shown in the figures, the knob 152 may be arranged adjacent the control panel 220 on one side of the housing 110.

In operation, a rotation of the knob 152 may transmit a signal to the controller 150 to regulate, for example, a brightness of the display screen 400. Upon receiving the signal from rotation of the knob 152, the controller may process the signal and adjust the brightness. Additionally, or alternatively, when a user uses the knob 152 for any operations, the controller 150 may detect signals related to such uses, and may adjust and/or request that the display be adjusted to a suitable brightness. It should be appreciated that other controller-types may be used with or in place of the knob 152 (e.g., a switch, button, depressible icon of a user interface, etc.) for controlling various functions of the charging station 100.

With continued reference to the figures, the wireless charging system 300 may include an electrical input (not shown) operably connected to a charging module (pad) 302. The charging module 302 may be arranged within the housing 110 and/or the recessed area 112, which may be at a top of the housing 110.

The electrical input of the wireless charging system 300 may be operably connected to output ends of one or more components of the charging station 100, including, but not limited to, the managing circuit system 130, the discharging circuit 140, and/or electrical power input 120 for receiving electrical power to wirelessly charge an electrical device (e.g., the mobile device) via the charging module 302.

In some embodiments, the charging module 302 may be a coil module. Additionally, or alternatively, the charging module 302 may be a Qi standard charging module, which is an open interface standard defining wireless power transfer using inductive charging. The charging module 302 may employ a maximum charging solution of 10 W, and may be compatible with wireless charging devices of 5 W, 7.5 W and 10 W.

The wireless charging system 300 may further include a cover shaped and/or otherwise sized to cover at least part of the charging module 302. In some embodiments, the cover 304 may have an anti-skid texture or be made substantially of materials forming an anti-skid part 306 (e.g., an anti-skid pad). The anti-skid part 306 may be arranged or otherwise positioned to cover the charging module 302 when positioned within the recessed area 112. In some embodiments, the anti-skid part 306 may be provided to assist with arranging the mobile device over the wireless charging system 300.

For assisting with arranging the mobile device, the anti-skid part 306 may include markings (not shown) to assist a user with arranging the mobile device on the anti-skid part 306. The markings may be included on or otherwise embedded in the anti-skid part 306, or in some embodiments, provided as a raised portion in a surface of the anti-skid part 306. In some embodiments, the markings may correspond to a location of the charging module 302 covered by the anti-skid part 306. Additionally, or alternatively, the markings may correspond to a feature of the mobile device (e.g., a shape of the mobile device and/or the location of the mobile device's wireless charging receiver and/or transceiver).

It should be appreciated that the anti-skid part 306 may be formed from materials that do not interfere with the wireless charging capabilities of the wireless charging system 300 to allow for the charging module 302 to wirelessly charge the mobile device through the anti-skid part 306. In one embodiment, the anti-skid part 306 may be formed from a silica gel material.

It should be appreciated that the anti-skid part 306 may prevent or otherwise limit a movement of the mobile device positioned on the anti-skid part 306. In some embodiments, the size and/or shape of the anti-skid part 306 may correspond with the size and/or shape of the recessed area 112 such that the anti-skid part 306 is flushed or substantially flushed with the top of the housing 110, or in other embodiments, such that only a portion of the anti-skid part 306 is raised beyond the top of the housing 110.

Additionally, or alternatively, the wireless charging system 300 may be operably connected to the display screen 400 for lighting up the wireless charging display module upon beginning a wireless charging operation and/or for displaying information associated with the wireless charging system 300.

With continued reference to the figures, the wireless charging system 300 may include the wireless charging printed circuit board plug-in assembly (W-PCBA) 308. It should be appreciated that the W-PCBA 308 may be operably connected to the charging module 302 for assisting with the distribution of power to the wireless charging system 300. Additionally, or alternatively, the W-PCBA 308 may be operably connected to the front panel 204 or similar display of the charging station 100 to display information corresponding to a mobile device being charged and/or the wireless charging system 300 (e.g., time remaining to charge, phone status, etc.).

With continued reference to the figures, the power bank 160 of the charging station 100 may be operably connected to the electrical power input 120 for storing electrical power received from the external power source via the electrical power input 120. In some embodiments, the power bank 160 may be a battery (e.g., a lithium battery). The power bank 160 may be rechargeable, and may include an input operably connected to an output of the electrical power input 120 for receiving the electrical power.

The power bank 160 may also include an output for distributing the stored electrical power to one or more components and/or systems of the charging station 100 (e.g., the discharging circuit 140). In some embodiments, the output of the power bank 160 may be electrically connected to an input for each of the components and/or systems of the charging station 100 requiring electrical power.

In operation, and upon identifying that the charging station 100 is no longer powered by the external power source, the charging station 100 may seamlessly transition to the power bank 160 from the external power source for supplying electrical power to its components and/or systems. For the seamless transition, the charging station 100 may include a switching circuit (not shown) operable to switch between power sources. In some embodiments, the switching circuit may be part of the managing circuit system 130 and/or the managing circuit system 130 may include the switching functionality of the switching circuit.

In yet a further exemplary embodiment, the power bank 160 may distribute power to the other components while the charging station 100 is connected to the external power source. In this embodiment, the power bank 160 distributed power may be used to supplement the power from the external power source distributed to the components and/or systems via the managing circuit system 130. It should be appreciated that the supplemental power provided by the power bank 160 assists to maintain optimal charging capabilities so that no output (e.g., any electrical power receptacle 124) lacks sufficient power (e.g., near full power capacity) to charge a connected electrical device.

Additionally, or alternatively, the charging circuit 138 of the charging station 100 may be operable to distribute electrical power received via the electrical power input 120 to the power bank 160 for storing electrical power therein, and/or to distribute electrical power to one or more system of the charging station 100 (e.g., the timer system and/or wireless charging system 300).

When the electrical power input 120 is connected to an external power supply source, the power regulating circuit 136 may begin to distribute power to the charging circuit 138, and to detect a status of the power bank 160. If the power bank 160 status is not full (i.e., at capacity), the charging circuit 138 may begin to charge the power bank 160 until the power bank 160 status (capacity) is full.

With continued reference to the figures, the discharging circuit 140 of the charging station 100 may be downstream from the electrical power input 120 and/or, in some embodiments, the power bank 160, and may be operable to distribute power from the electrical power input 120 and/or the power bank 160.

In some embodiments, and depending on the arrangement of the discharging circuit 140, the discharging circuit 140 may discharge converted and/or unconverted electrical power to the components and/or systems of the charging station 100. In some embodiments, the power switch 122 may be arranged between the discharging circuit 140 and the electrical power source.

With continued reference to the figures, the charging station 100 may include a booster circuit 142. An input end of the booster circuit 142 may be electrically connected to an output end of the discharging circuit 140. In some embodiments, the booster circuit 142 may be a DC to DC power converter operable to step up voltage (while stepping down current) from its input supply to its output load. The booster circuit 142 may include at least two semiconductors (e.g., a diode and a transistor) and at least one energy storage element (e.g., a capacitor, inductor, or both in combination). For reducing voltage ripple, for example, one or more filters made of capacitors (sometimes in combination with inductors) may be added to a converter's output (e.g., a load-side filter) and input (e.g., supply-side filter).

In some embodiments, the power switch 122 may be a design switch to control the AC/DC rectifier circuit 132 so that a lower booster circuit 142 of the discharging circuit 140 will also have no electric output.

With continued reference to FIG. 4, when charging, for example, a 5V mobile phone, the path of the charging operation may be from the AC/DC rectifier circuit 132 to the DC/DC buck circuit 134, and then the power regulating circuit 136 to the discharging circuit 140. This process is a descending voltage process which may result in a voltage from 12V to 5V.

Additionally, or alternatively, when a user is connected to a QC3.0 phone at the same time as the 5V mobile phone is connected, and when the QC3.0 needs 9V or 12V, the controller 150 may be operable (e.g., via programming logic) to detect the signal at the QC3.0, and to notify the discharging circuit 140 to adjust the voltage (i.e., to step up the voltage), for example, to 9V or 12V.

In some embodiments, the booster circuit 142 may initially boost (raise) the voltage being stepped up, and upon the power regulating circuit 136 adjusting the action directly from the AC/DC rectifier circuit 132 to the power regulating circuit 136 to the discharging circuit 140, the booster circuit 142 may adjusts the power and voltage to 12V. At this time, the booster circuit 142 may begin reducing the work of voltage rise and form a cooperative function.

With continue reference to the figures, the managing circuit system 130 of the charging station 100 may be provided for controlling or otherwise managing one or more operations (including functions) and/or systems of the charging station 100. The managing circuit system 130 may be the first component/circuit downstream from the electrical power input 120 and/or fuse. The managing circuit system 130 may be a processing circuit operably connected to a memory of the managing circuit system 130 and/or charging station 100.

The managing circuit system 130 may be operably configured to process programmable instructions (e.g., stored in the memory) for operating the charging station 100 and/or one or more of the components or systems of the charging station 100 (e.g., the controller 150). It should be appreciated that one or more of the other converters/circuits may be similarly configured to the managing circuit system 130 in that each may include be a processing circuit (or connected to a processing circuit) and a memory for executing instruction stored on the memory for performing the functions for each component described herein.

In some embodiments, the managing circuit system 130 may perform the operations of one or more of the components (e.g., AC/DC rectifier circuit 132, the DC/DC buck circuit 134, the power regulating circuit 136, the charging circuit 138, the discharging circuit 140, and/or the booster circuit 142). Additionally, or alternatively, each circuit and/or converter may be operably connected to the managing circuit system 130 for performing its operations (functions) within the charging station 100 via the managing circuit system 130.

In yet a further exemplary embodiment, the controller 150 may be operably connected to the managing circuit system 130 for managing predetermined operations of the controller 150, which may include controlling specific display, timing, and/or charging operations.

Figure 2A:
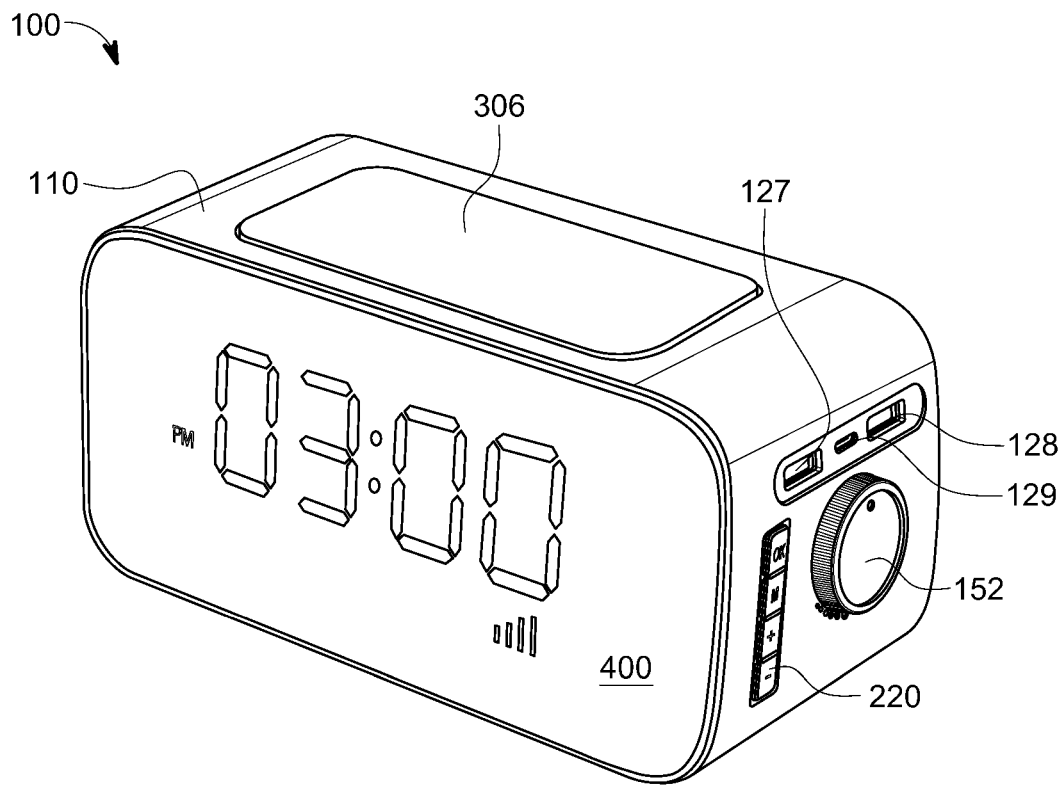
FIG. 2A illustrates a perspective view of an exemplary embodiment of a multifunctional charging station in accordance with the disclosure provided herein.
Figure 2B:
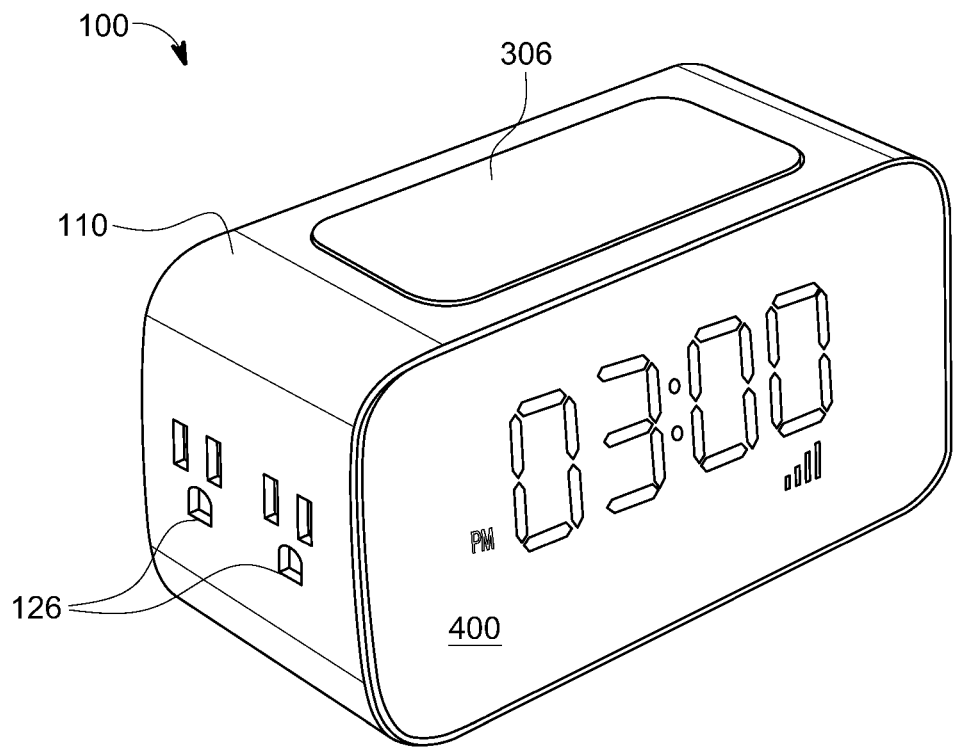
FIG. 2B illustrates a second perspective view of an exemplary embodiment of a multifunctional charging station in accordance with the disclosure provided herein.

With reference now to FIG. 2A and FIG. 2B, the charging station 100 may further include one or more electrical power receptacles 124 operable to distribute electrical power from the electrical power input 120 (or power bank 160) to external devices connected to the electrical power receptacle 124 (e.g., via a cable (not shown)). The electrical power receptacle 124 may be provided on at least one side of the housing 110. In the embodiment of FIG. 2A and FIG. 2B, a plurality of electrical power receptacle 124 are provided on opposed sides of the housing 110.

In some embodiments, at least one of the electrical power receptacle 124 may be an AC output interface 126 (two shown in FIG. 1) operable to provide electrical current to devices requiring connections via the AC output interface 126. The AC output interface 126 may be arranged on one side of the housing 110. In some embodiments, the AC output interface 126 may be secured to the housing via a bracket which may be clamped or otherwise secured to the housing 110.

An input of the AC output interface 126 may be electrically connected with an output end of the electrical power input 120 (or fuse), for example, to provide unconverted electrical power, or in some embodiments, further downstream to provide converted electrical power.

Additionally, or alternatively, one or more electrical power receptacles 124 may be a USB interface (e.g., a USB 5V 1 A interface 127 and/or a USB QC3.0 interface 128), a Type-C interface 129, and/or lightning cable interface (not shown). In the embodiment of FIG. 1, one side of the housing 110 may include openings 125 (FIG. 1) sized and/or shaped to accommodate the USB 5V 1 A interface 127, a USB QC3.0 interface 128, and a Type-C interface 129, which may be adjacent to each other on the one side.

In some embodiments, input ends of the timer system 200, the display screen 400, the controller 150, the USB 5V 1 A interface 127, and the wireless charging system 300 may be electrically connected with the low-voltage output end of the power regulating circuit 136, respectively.

Additionally, or alternatively, input ends of the Type-C interface 129 and USB QC3.0 interface 128 may be electrically connected with a high-voltage output end of the power regulating circuit 136, respectively. In some embodiments, input ends of the Type-C interface 129 and USB QC3.0 interface 128 may be electrically connected with output end(s) of the booster circuit 142, respectively. Additionally, or alternatively, an input end of the USB 5V 1 A interface 127 may be electrically connected with an output end of the discharging circuit 140.

With continue reference to the figures, the charging station 100 may include one or more anti-skid sheets 180 disposed at the base of the housing 110 for limiting or otherwise restricting a movement of the charging station 100. In some embodiments, the anti-skid sheet 180 may be made of a silica gel material. It should be appreciated that other materials (e.g., a rubber) may be used forming the anti-skid sheet 180 or in place of the anti-skid sheet 180 for maintaining the charging station 100 in its desired location.

It should be appreciated that in operation, and when the electrical power input 120 is connected with the external power source, the power bank 160 may be charging, while the external power source exclusively powers other components and systems of the charging station 100, including, but not limited to, the AC output interface 126, the DC output regulator, the display screen 400, the wireless charging system 300, and the controller 150.

In some embodiments, when the electrical power input 120 disconnects from the external power source (or if the power switch 122 is in the off position), and alternating current is no longer being received via the electrical power input 120, the power bank 160 may seamlessly connect with the DC output regulator, the display screen 400, the wireless charging system 300, and the controller 150 to supply stored power thereto.

Additionally, or alternatively, when the charging station 100 is operational, an input end of the timer system 200, an input end of the display screen 400, an input end of the controller 150, an input end of the USB 5V 1 A interface 127 and an input end of the wireless charging system 300 may be electrically connected with the low-voltage output end of the power regulating circuit 136, respectively, for receiving electrical power. An output end of the power bank 160 may be electrically connected with an input end of the discharging circuit 140. The input end of the timer system 200, the input end of the display screen 400, the input end of the controller 150, the input end of the DC output interface, and the input end of the wireless charging system 300 may also be electrically connected with output end(s) of the discharging circuit 140, respectively, for receiving electrical power.

In some embodiments, the input end of the timer system 200 may be electrically connected with the input end of the display screen 400 and the output end of the controller 150. When a PD technology of the Type-C interface 129 and a rapid charging technology of the USB QC3.0 interface 128 are used for charging, a direct current of 12 V may be directly used. In this embodiment, the current may directly pass through the AC/DC rectifier circuit 132 and the power regulating circuit 136 to supply power to the Type-C interface 129 and the USB QC3.0 interface 128 through the high-voltage output end without needing to pass through the DC/DC buck circuit 134. When the electric device needs a direct current of 5 V, the current outputted by the AC/DC rectifier circuit 132 must pass through the DC/DC buck circuit 134 to supply power to the electric device through the low-voltage output end of the power regulating circuit 136.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

We claim:

1. A multifunctional charging station comprising:
a timer system,
an AC input connector,
an AC output interface,
a DC output interface,
a display screen,
a wireless charging system,
a controller, and
a managing circuit,
wherein the controller, the managing circuit, the alarm clock and the wireless charging system are all arranged in the housing, a top portion of the housing is provided with a plane for placing an electronic device, the wireless charging system is arranged below the plane, the luminous display screen is arranged on a side of the housing, the AC input connector, the AC output interface and the DC output interface are all arranged on a surface of the housing, an input end of the AC output interface is electrically connected with an output end of the AC input connector, the output end of the AC input connector is electrically connected with an input end of the managing circuit, an input end of the alarm clock, an input end of the luminous display screen, an input end of the controller, an input end of the DC output interface and an input end of the wireless charging system are electrically connected with an output end of the managing circuit respectively, and the input end of the alarm clock is electrically connected with the input end of the luminous display screen and an output end of the controller;
wherein the managing circuit comprises:
an AC/DC rectifier circuit, a DC/DC buck circuit and
a power regulating circuit,
wherein an input end of the AC/DC rectifier circuit is electrically connected with the output end of the AC input connector, an output end of the AC/DC rectifier circuit is electrically connected with an input end of the DC/DC buck circuit, an output end of the DC/DC buck circuit is electrically connected with an input end of the power regulating circuit, and the alarm clock, the luminous display screen, the controller, the DC output interface and the wireless charging system are electrically connected with an output end of the power regulating circuit respectively;
wherein the DC output interface comprises:
a Type-C interface,
a USB QC3.0 interface, and
a USB 5V 1A interface, wherein the output end of the AC/DC rectifier circuit is electrically connected with the input end of the power regulating circuit, and an input end of the Type-C interface, an input end of the USB QC3.0 interface and an input end of the USB 5V 1A interface are electrically connected with the output end of the power regulating circuit respectively.

2. A multifunctional charging station comprising:
a timer system,
an AC input connector,
an AC output interface,
a DC output interface,
a display screen,
a wireless charging system,
a controller,
a managing circuit,
a battery,
a charging circuit,
a discharging circuit and
a booster circuit,
wherein the controller, the managing circuit, the alarm clock and the wireless charging system are all arranged in the housing, a top portion of the housing is provided with a plane for placing an electronic device, the wireless charging system is arranged below the plane, the luminous display screen is arranged on a side of the housing, the AC input connector, the AC output interface and the DC output interface are all arranged on a surface of the housing, an input end of the AC output interface is electrically connected with an output end of the AC input connector, the output end of the AC input connector is electrically connected with an input end of the managing circuit, an input end of the alarm clock, an input end of the luminous display screen, an input end of the controller, an input end of the DC output interface and an input end of the wireless charging system are electrically connected with an output end of the managing circuit respectively, and the input end of the alarm clock is electrically connected with the input end of the luminous display screen and an output end of the controller;
wherein the managing circuit comprises:
an AC/DC rectifier circuit,
a DC/DC buck circuit and
a power regulating circuit,
wherein an input end of the AC/DC rectifier circuit is electrically connected with the output end of the AC input connector, an output end of the AC/DC rectifier circuit is electrically connected with an input end of the DC/DC buck circuit, an output end of the DC/DC buck circuit is electrically connected with an input end of the power regulating circuit, and the alarm clock, the luminous display screen, the controller, the DC output interface and the wireless charging system are electrically connected with an output end of the power regulating circuit respectively;
wherein the DC output interface comprises:
a Type-C interface,
a USB QC3.0 interface, and
a USB 5V 1A interface, wherein the output end of the AC/DC rectifier circuit is electrically connected with the input end of the power regulating circuit, and an input end of the Type-C interface, an input end of the USB QC3.0 interface and an input end of the USB 5V 1A interface are electrically connected with the output end of the power regulating circuit respectively;
wherein an input end of the charging circuit is electrically connected with the output end of the power regulating circuit, an output end of the charging circuit is electrically connected with an input end of the battery, an output end of the battery is electrically connected with an input end of the discharging circuit, the input end of the alarm clock, the input end of the luminous display screen, the input end of the controller, the input end of the DC output interface and the input end of the wireless charging system are electrically connected with an output end of the discharging circuit respectively, an input end of the booster circuit is electrically connected with the output end of the discharging circuit, the input end of the Type-C interface and the input end of the USB QC3.0 interface are electrically connected with an output end of the booster circuit respectively, and the USB 5V 1A interface is electrically connected with the output end of the discharging circuit.

3. The multifunctional charging station according to claim 2, wherein a surface of the plane is provided with an anti-skid layer.

4. The multifunctional charging station according to claim 2, wherein a bottom surface of the housing is provided with an anti-skid sheet.

5. The multifunctional charging station according to claim 1, wherein the wireless charging system is a Qi standard wireless charger.

6. The multifunctional charging station according to claim 1 further comprising:
a knob for regulating a brightness of the luminous display screen, wherein the knob is arranged on the surface of the housing, and the knob is electrically connected with the controller.

7. The multifunctional charging station according to claim 1 further comprising:
a control panel for setting the alarm clock, wherein the control panel is arranged on the surface of the housing, and the control panel is electrically connected with the controller.

8. The multifunctional charging station according to claim 1, wherein a surface of the plane is provided with an anti-skid layer.

9. The multifunctional charging station according to claim 1, wherein the output end of the AC input connector is provided with a fuse wire.

10. The multifunctional charging station according to claim 1, wherein a bottom surface of the housing is provided with an anti-skid sheet.

11. The multifunctional charging station according to claim 2 further comprising:
a knob for regulating a brightness of the luminous display screen, wherein the knob is arranged on the surface of the housing, and the knob is electrically connected with the controller.

12. The multifunctional charging station according to claim 2 further comprising:
a control panel for setting the alarm clock, wherein the control panel is arranged on the surface of the housing, and the control panel is electrically connected with the controller.

13. The multifunctional charging station according to claim 2, wherein the output end of the AC input connector is provided with a fuse wire.

14. The multifunctional charging station according to claim 2, wherein the wireless charging system is a Qi standard wireless charger.

* * * * *